(12) United States Patent
Yoshimura

(10) Patent No.: US 8,415,903 B2
(45) Date of Patent: Apr. 9, 2013

(54) ULTRASONIC MOTOR

(75) Inventor: Katsuhiko Yoshimura, Koganei (JP)

(73) Assignee: Olympus Corporation, Tokyo (JP)

( * ) Notice: Subject to any disclaimer, the term of this patent is extended or adjusted under 35 U.S.C. 154(b) by 361 days.

(21) Appl. No.: 12/838,772

(22) Filed: Jul. 19, 2010

(65) Prior Publication Data

US 2011/0018475 A1 Jan. 27, 2011

(30) Foreign Application Priority Data

Jul. 21, 2009 (JP) ................. 2009-170388

(51) Int. Cl.
*H01L 41/04* (2006.01)
*H01L 41/08* (2006.01)

(52) U.S. Cl.
USPC ........... 318/119; 318/116; 318/114; 318/118; 310/323.16; 310/323.17; 310/311; 310/316.01; 310/323.06; 310/323.02; 29/25.35

(58) Field of Classification Search .......... 318/119, 318/114, 118; 310/323.03, 345, 348, 323.06, 310/311, 316.01, 323.02; 29/25.35
See application file for complete search history.

(56) References Cited

U.S. PATENT DOCUMENTS

| | | | | |
|---|---|---|---|---|
| 5,053,669 A | * | 10/1991 | Saeki et al. | 310/323.09 |
| 5,130,619 A | * | 7/1992 | Izuno | 318/116 |
| 5,365,139 A | * | 11/1994 | Kasuga et al. | 310/316.02 |
| 5,644,199 A | * | 7/1997 | Nojima et al. | 318/114 |
| 6,144,140 A | * | 11/2000 | Iino et al. | 310/316.02 |
| 7,317,291 B2 | * | 1/2008 | Atsuta et al. | 318/119 |
| 7,449,814 B2 | * | 11/2008 | Kasai et al. | 310/323.02 |
| 7,501,745 B2 | * | 3/2009 | Koc et al. | 310/365 |
| 7,508,114 B2 | * | 3/2009 | Kasai et al. | 310/323.16 |
| 7,573,180 B2 | * | 8/2009 | Funakubo | 310/316.01 |
| 7,592,738 B2 | * | 9/2009 | Funakubo | 310/323.16 |
| 7,602,100 B2 | * | 10/2009 | Okada | 310/316.02 |
| 7,759,840 B2 | * | 7/2010 | Funakubo et al. | 310/323.01 |
| 7,960,925 B2 | * | 6/2011 | Kudo | 318/119 |
| 2008/0030101 A1 | * | 2/2008 | Funakubo | 310/316.02 |

FOREIGN PATENT DOCUMENTS

JP 2006-304425 11/2006

* cited by examiner

*Primary Examiner* — Rita Leykin
(74) *Attorney, Agent, or Firm* — Scully Scott Murphy & Presser, PC

(57) ABSTRACT

An ultrasonic motor in which driving signals of two phases are applied to a vibrator having a driving member in contact with a driven member to simultaneously generate a longitudinal vibration and a flexural vibration, thereby generating an elliptic vibration in the vibrator, and the driving member frictionally drives the driven member upon obtaining a driving force from the elliptic vibration, is configured as follows. Namely, the ultrasonic motor includes a driving phase difference switching unit which switches a driving phase difference serving as a phase difference between the driving signals of the two phases, and changes a switching cycle of the driving phase difference.

12 Claims, 7 Drawing Sheets

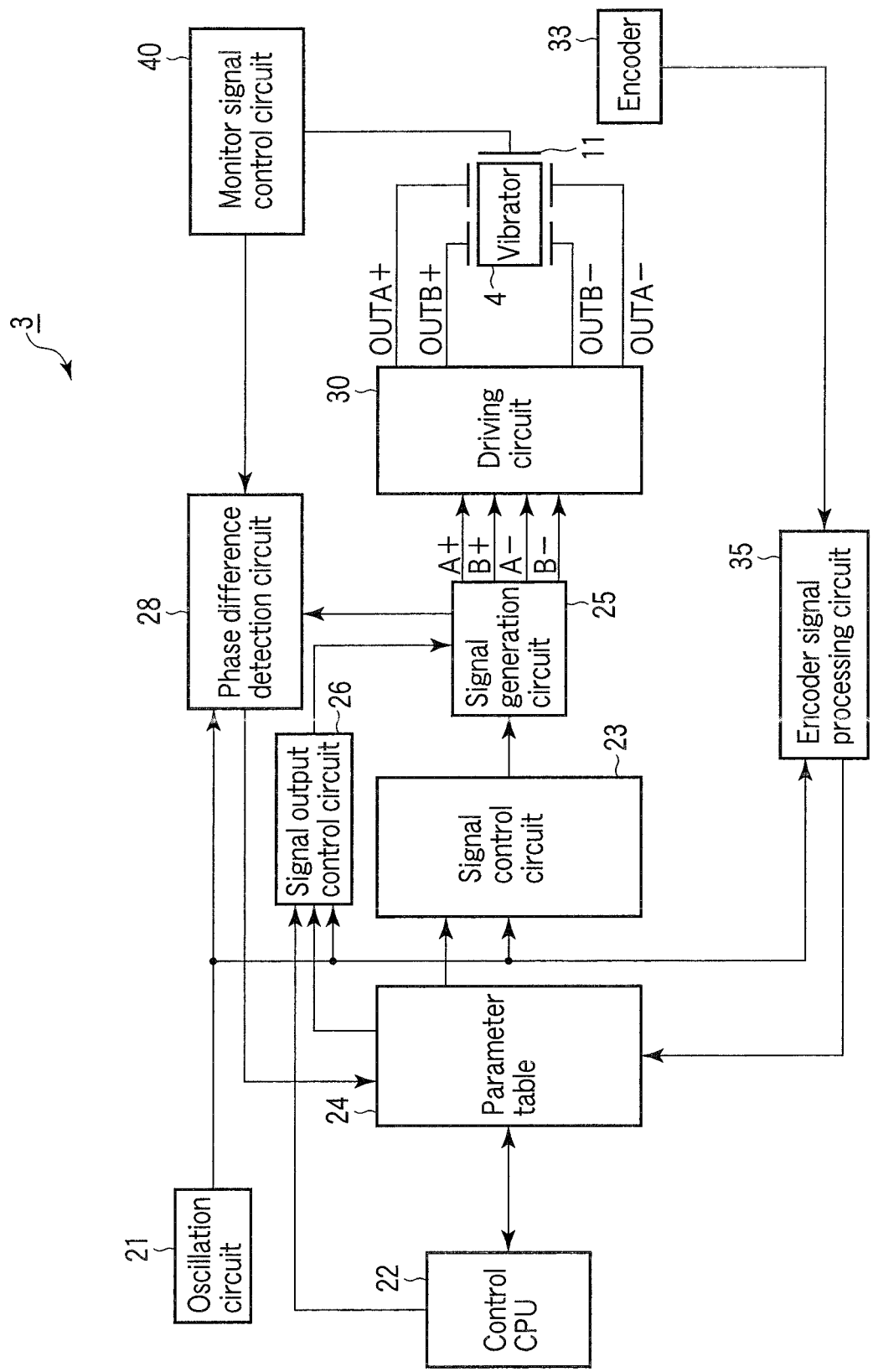
F I G. 5

| Input to driving circuit 30 | | Output from driving circuit 30 | |
|---|---|---|---|
| A+ or B+ | A- or B- | OUTA+/OUTB+ | OUTA-/OUTB- |
| L | L | – | – |
| L | H | L | H |
| H | L | H | L |
| H | H | L | L |

ULTRASONIC MOTOR

CROSS-REFERENCE TO RELATED APPLICATIONS

This application is based upon and claims the benefit of priority from the prior Japanese Patent Application No. 2009-170388, filed Jul. 21, 2009, the entire contents of which are incorporated herein by reference.

BACKGROUND OF THE INVENTION

1. Field of the Invention

The present invention relates to an ultrasonic motor using vibrations of a vibrator such as a piezoelectric element.

2. Description of the Related Art

Recently, an ultrasonic motor using vibrations of a vibrator such as a piezoelectric element is receiving attention as a novel motor which replaces an electromagnetic motor. The ultrasonic motor is superior to the conventional electromagnetic motor because it can obtain high thrust at low speed without any gear, have high retention at power off, long stroke, and high resolving power, is very quiet, does not generate magnetic noise, and is free from the influence of magnetic noise.

In the ultrasonic motor, an ultrasonic vibrator is pressed against a driven member serving as a relative motion member via a driving member serving as a frictional member. When the ultrasonic vibrator vibrates, a frictional force is generated between the driving member and the driven member to drive the driven member.

For example, the following ultrasonic motor is known. In this ultrasonic motor, alternating signals of two phases are applied to the ultrasonic vibrator to simultaneously excite longitudinal and flexural vibrations in the ultrasonic vibrator, thereby generating elliptic vibrations in the driving member. A driving force is obtained from the elliptic vibrations to relatively move the driven member.

As a technique concerning the ultrasonic motor, for example, Jpn. Pat. Appln. KOKAI Publication No. 2006-304425 discloses the following technique. In an ultrasonic motor operating method disclosed in Jpn. Pat. Appln. KOKAI Publication No. 2006-304425, alternating voltages of two phases having a predetermined phase difference and predetermined driving frequency are applied to an electromechanical transducer for driving. As a result, two different vibration modes are simultaneously generated to cause almost elliptic vibrations at the output terminal. According to this operating method, a press force for pressing the output terminal of the ultrasonic vibrator against the driven member is set based on a signal output from an electromechanical transducer for vibration detection so that mechanical resonance frequencies in the two different vibration modes coincide with each other.

The technique disclosed in Jpn. Pat. Appln. KOKAI Publication No. 2006-304425 provides an ultrasonic motor which simultaneously generates a plurality of vibration modes and can efficiently generate each vibration mode to stably obtain a high motor output.

As a driving characteristic of the ultrasonic motor, driving becomes unstable in a low-speed region (driving phase difference is almost 180°). Under the circumstances, burst driving (intermittent driving) is known as a technique of stably driving an ultrasonic motor at low speed. In the burst driving, a driving signal applied to an ultrasonic vibrator is cyclically enabled and disabled. However, the burst driving generates abnormal noise upon driving.

The following driving method is proposed as a technique for reducing generation of abnormal noise. More specifically, a plurality of driving phase differences are set, and one of them is set to have a driving speed of 0. These driving phase differences are cyclically switched to drive an ultrasonic motor. Also in this case, the ultrasonic motor can be stably driven at low speed, similar to the foregoing burst driving. This driving method can reduce generation of abnormal noise, compared to the burst driving. However, further reduction of abnormal noise is required.

BRIEF SUMMARY OF THE INVENTION

The present invention has been made in consideration of the above situation, and has as its object to provide an ultrasonic motor which reduces generation of abnormal noise upon driving.

According to an aspect of the present invention, there is provided an ultrasonic motor in which driving signals of two phases are applied to a vibrator having a driving member in contact with a driven member to simultaneously generate a longitudinal vibration and a flexural vibration, thereby generating an elliptic vibration in the vibrator, and the driving member frictionally drives the driven member upon obtaining a driving force from the elliptic vibration, the motor comprising a driving phase difference switching unit which switches a driving phase difference serving as a phase difference between the driving signals of the two phases, and changes a switching cycle of the driving phase difference.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a block diagram showing the schematic internal arrangement of a driving device;

DETAILED DESCRIPTION OF THE INVENTION

First Embodiment

An ultrasonic motor according to the first embodiment of the present invention will be described with reference to the accompanying drawing.

In the first embodiment, an ultrasonic motor, and a driving device for driving the ultrasonic motor are regarded as separate devices independent of each other, and a structure formed from these devices will be called an ultrasonic motor system for descriptive convenience. However, these names are used merely for descriptive convenience, and devices including even the driving device may be regarded as one ultrasonic motor.

Figure 1:
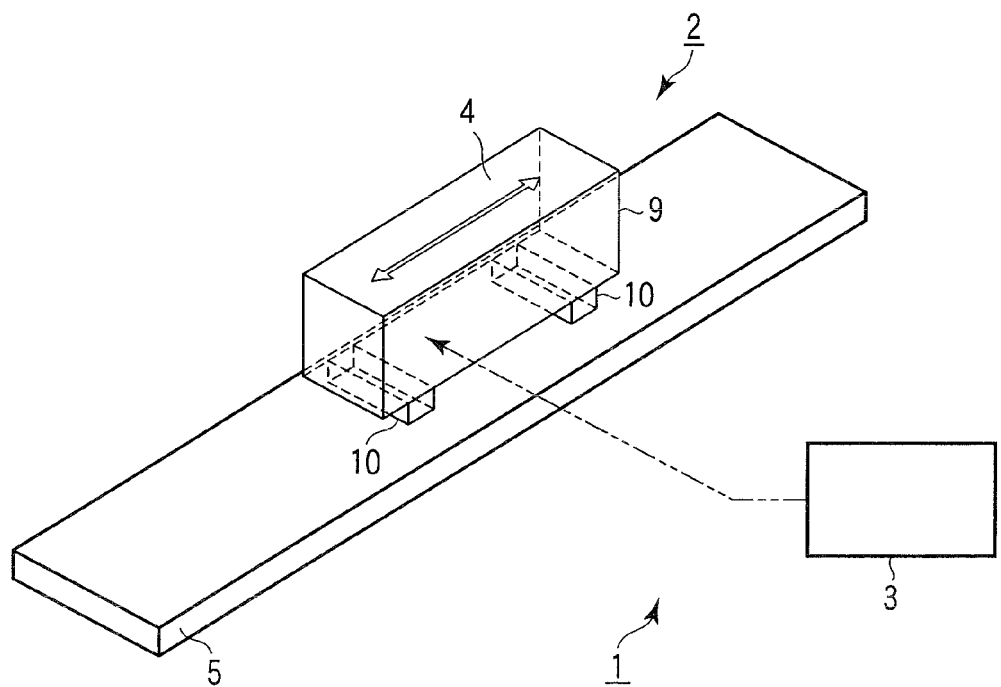
FIG. 1 is a perspective view showing an example of the schematic structure of an ultrasonic motor system according to the first embodiment of the present invention.

FIG. 1 is a perspective view showing an example of the schematic structure of an ultrasonic motor system.

As shown in FIG. 1, an ultrasonic motor system 1 includes an ultrasonic motor 2, and a driving device 3 for driving the ultrasonic motor 2. The ultrasonic motor 2 includes an ultrasonic vibrator 4, and a driven member 5 which is driven by the ultrasonic vibrator 4.

Figure 2:
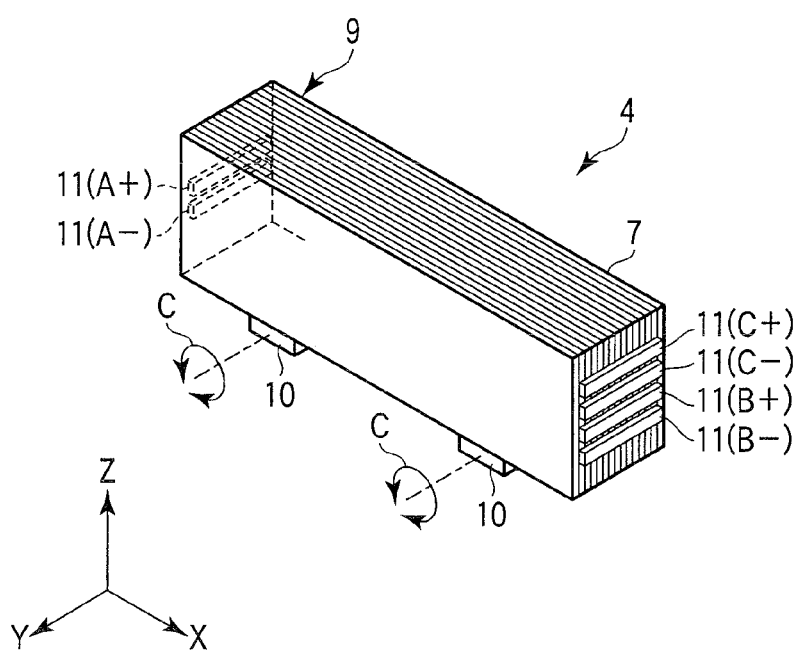
FIG. 2 is a perspective view showing an example of the structure of an ultrasonic vibrator.

As shown in FIG. 2, the ultrasonic vibrator 4 includes a rectangular parallelepiped piezoelectric stack 9, and two driving members 10. The piezoelectric stack 9 is formed by stacking a plurality of rectangular plate-like piezoelectric ceramic sheets 7 each having sheet-like internal electrodes (not shown) on one surface. The driving members 10 are attached by adhesion or the like to a surface of the piezoelectric stack 9 that faces the driven member 5.

Reference numeral 11 denotes an external electrode. Each external electrode 11 is connected to all internal electrodes (not shown) which are arranged at the same position on the piezoelectric ceramic sheets 7 of the same type. This equalizes the potentials of the internal electrodes (not shown) which are arranged at the same position on the piezoelectric ceramic sheets 7 of the same type.

Note that the external electrodes 11 are connected to a controller (not shown) via wires (not shown). The wire is arbitrarily a lead wire, flexible board, or the like as long as it is flexible.

The operation of the piezoelectric stack 9 will be explained.

Four external electrodes 11 formed on one end face of the piezoelectric stack 9 in the longitudinal direction are connected sequentially from the top in FIG. 2 to internal electrodes (not shown) corresponding to vibration detection C phases "C−" and "C+", and those (not shown) corresponding to driving B phases "B−" and "B+". Two external electrodes 11 formed on the other end face of the piezoelectric stack 9 in the longitudinal direction are connected to internal electrodes (not shown) corresponding to driving A phases "A−" and "A+".

Figure 3:
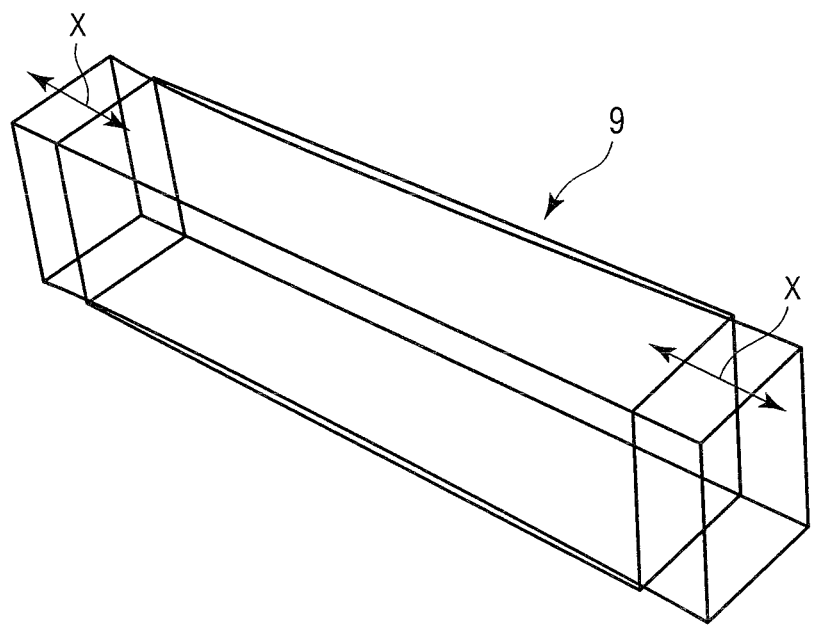
FIG. 3 is a perspective view showing longitudinal vibrations of a piezoelectric stack.
Figure 4:
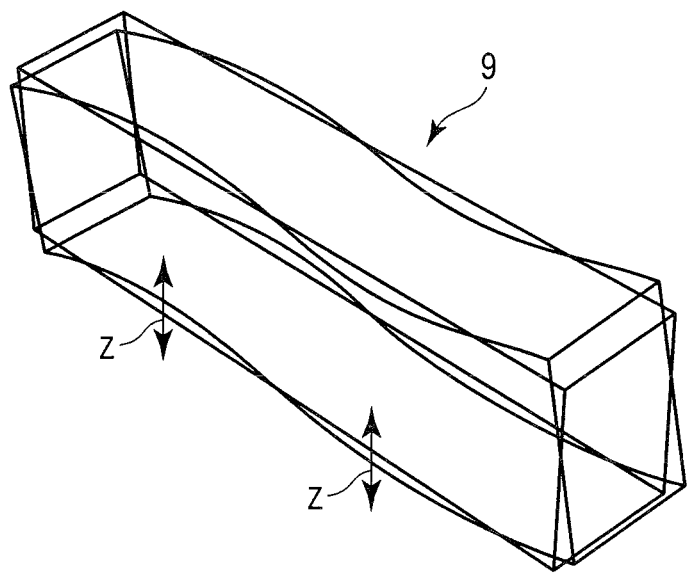
FIG. 4 is a perspective view showing flexural vibrations of the piezoelectric stack.

When in-phase alternating voltages having a frequency corresponding to a resonance frequency or its neighboring frequency are respectively applied to the A and B phases, first-order longitudinal vibrations are excited as shown in FIG. 3. When antiphase alternating voltages having a frequency corresponding to a resonance frequency are respectively applied to the A and B phases, second-order flexural vibrations are excited as shown in FIG. 4. FIGS. 3 and 4 are views showing computer analysis results based on a finite-element method.

When first-order longitudinal vibrations are generated in the piezoelectric stack 9, the driving members 10 move (are displaced) in the longitudinal direction (X direction shown in FIG. 3) of the piezoelectric stack 9. In contrast, when second-order flexural vibrations are generated in the piezoelectric stack 9, the driving members 10 move (are displaced) in the widthwise direction (Z direction shown in FIG. 4) of the piezoelectric stack 9.

At this time, driving alternating voltages which are out of phase by 90° and have a frequency corresponding to a resonance frequency or its neighboring frequency are applied to the A- and B-phase external electrodes 11. Then, first-order longitudinal vibrations and second-order flexural vibrations are simultaneously generated in the piezoelectric stack 9, generating clockwise or counterclockwise almost elliptic vibrations at the positions of the driving members 10 (see arrows C in FIG. 2).

Charges corresponding to longitudinal vibrations generated in the ultrasonic vibrator are excited at the internal electrodes (not shown) for detection. Hence, a signal (to be referred to as a "driving detection signal") proportional to the longitudinal vibrations is detected via the C-phase (C+ and C−) external electrodes 11. The vibration detection signal is supplied to the driving device 3 (see FIG. 1), and used for control of the ultrasonic vibrator 4 and the like.

The driving device 3 will be described in detail. FIG. 5 is a block diagram showing the schematic internal arrangement of the driving device 3. As shown in FIG. 5, the driving device 3 includes an vibration circuit (reference signal generation means) 21, control CPU 22, signal control circuit 23, parameter table 24, signal generation circuit 25, signal output control circuit 26, phase difference detection circuit 28, driving circuit 30, encoder 33, encoder signal processing circuit 35, and monitor signal control circuit 40.

The parameter table 24 stores the set values of various parameters such as the driving frequency, driving phase difference (phase difference between A- and B-phase driving signals), pulse edge delay, and tracking phase difference, the count value of the encoder 33, and various parameters (details of which will be described later) regarding switching of the driving phase difference.

The vibration circuit 21 generates reference signals (clock signals), and outputs them to the signal control circuit 23, signal generation circuit 25, signal output control circuit 26, and phase difference detection circuit 28.

The control CPU 22 sets a variety of parameters in the parameter table 24, and controls the driving signal of the ultrasonic vibrator 4. The control CPU 22 reads out various parameters (e.g., phase difference and encoder count value) from the parameter table 24, and performs position control, speed control, driving phase difference switching, and the like. More specifically, the control CPU 22 creates a reference driving signal frequency command value, a command value for the phase difference between the A and B phases, and the like, based on the parameter table 24, a feedback value from the phase difference detection circuit 28 (to be described later), and the like. The control CPU 22 outputs the created values.

The signal control circuit 23 generates a reference driving signal S2 serving as a pulse signal having a predetermined frequency, based on a reference signal S1 input from the vibration circuit 21 and a frequency command value input from the control CPU 22. The signal control circuit 23 outputs the reference driving signal S2 to the signal generation circuit 25. The control CPU 22 gives, to the signal control circuit 23, a frequency command value for setting the frequency of the reference driving signal to the resonance frequency of the ultrasonic vibrator 4 or its neighboring frequency. In response to this, the signal control circuit 23 outputs a reference driving signal having almost the same frequency as the resonance frequency of the ultrasonic vibrator 4.

More specifically, the signal control circuit 23 includes a frequency control circuit, phase difference control circuit, and pulse edge delay control circuit.

The frequency control circuit of the signal control circuit 23 outputs a reference driving signal which determines the frequency of a driving signal, based on a frequency set value in the parameter table 24 using, as a reference, the pulse count of the reference signal output from the vibration circuit 21.

The phase difference control circuit of the signal control circuit 23 controls the phase difference between A- and B-phase signals serving as two driving signals, based on a driving phase difference set value in the parameter table 24 using, as a reference, the pulse count of the reference signal output from the vibration circuit 21.

The signal output control circuit 26 can directly control ON/OFF of the output of the signal generation circuit 25 from the control CPU 22 via the signal output control circuit 26, and the output order of A- and B-phase signals. Based on a value set in the parameter table 24, the signal output control circuit 26 controls the pulse count of a driving signal output from the signal generation circuit 25, and the output off time for intermittent driving.

Based on the reference driving signal S2, and the command value for the phase difference between the A and B phases, the signal generation circuit 25 generates A- and B-phase reference driving signals having a phase difference of 90°. Note that the signal output control circuit 26 controls ON/OFF of the output.

Figures 6, 7:
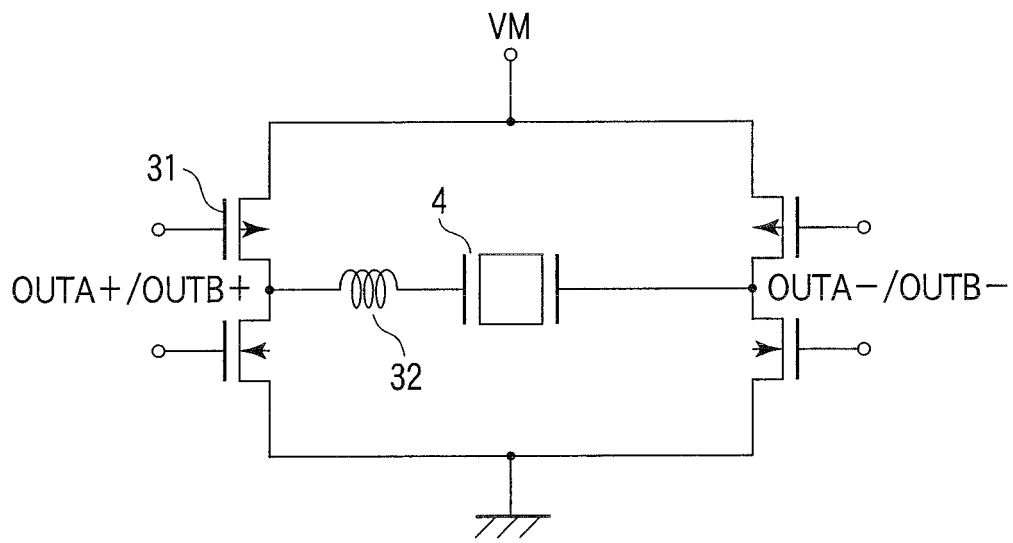
FIG. 6 is a circuit diagram showing an example of the structure of a driving circuit.
FIG. 7 is a table showing the truth table of input and output values when various driving alternating signals are input from a signal generation circuit to the driving circuit.

As shown in FIG. 6, the driving circuit 30 includes an H-bridge circuit 31 formed from a switching element, and an impedance matching & booster coil 32. Upon receiving various driving alternating signals from the signal generation circuit 25, the driving circuit 30 outputs driving alternating voltages OUTA+, OUTA−, OUTB+, and OUTB− in accordance with a truth table shown in FIG. 7.

Since the driving circuit 30 includes the coil 32, driving alternating signals serving as pulse signals are converted to have waveforms almost close to sine waves by the action of the coil 32. A- and B-phase driving alternating voltages having almost sine waves are applied to the A-phase (A+ and A−) and B-phase (B+ and B−) external electrodes 11 of the ultrasonic vibrator 4, respectively.

The C-phase (C+ and C−) internal electrodes detect longitudinal vibrations excited in the ultrasonic vibrator 4. An electrical signal proportional to the longitudinal vibrations is input to the phase difference detection circuit 28 via the C-phase (C+ and C−) external electrodes 11. The phase difference detection circuit 28 receives one driving alternating signal (e.g., A+ driving alternating signal) from the signal generation circuit 25.

The phase difference detection circuit 28 detects the phase difference between the vibration detection signal input via the external electrode 11 of the ultrasonic vibrator 4 and the driving alternating signal input from the signal generation circuit 25, and outputs it to the parameter table 24.

The monitor signal control circuit 40 shapes the waveform of a signal output from the external electrode 11, binarizes the signal, and outputs the binary signal to the phase difference detection circuit 28.

A method of driving the ultrasonic motor 2 implemented by the driving device 3 having the above-described arrangement will be explained. When the ultrasonic motor 2 is activated, the vibration circuit 21 outputs a reference signal to the signal control circuit 23. The control CPU 22 reads out the driving frequency of the ultrasonic motor 2 that is set in the parameter table, and gives the frequency as a frequency command value to the signal control circuit 23.

The control CPU 22 reads out, from the parameter table 24, the phase difference (driving phase difference) between the A and B phases that is set as an initial value, and gives it to the signal generation circuit 25. The signal control circuit 23 generates a reference driving signal S2 having a frequency set to the resonance frequency of the ultrasonic vibrator 4 or its neighboring frequency, and outputs it to the signal generation circuit 25.

Based on the reference driving signal S2 and the phase difference from the control CPU 22, the signal generation circuit 25 generates reference driving signals corresponding to the A phase (A+ and A−) and B phase (B+ and B−) having a predetermined phase difference.

The driving circuit 30 converts the A- and B-phase driving alternating signals into driving alternating voltages having sine waves, and applies them to the external electrodes 11 of the ultrasonic vibrator 4. Longitudinal vibrations and flexural vibrations as shown in FIGS. 3 and 4 are simultaneously excited in the ultrasonic vibrator, generating elliptic vibrations in the driving members 10. Accordingly, the driven member is relatively moved.

The C-phase internal electrodes and external electrodes 11 detect the longitudinal vibrations excited in the ultrasonic vibrator 4, inputting a vibration detection signal to the phase difference detection circuit 28. The phase difference detection circuit 28 detects the phase difference between the longitudinal vibrations excited in the ultrasonic vibrator 4 and the A-phase driving alternating signal output from the signal generation circuit 25. An electrical signal corresponding to the phase difference is output to the control CPU 22. If a count notified from the encoder signal processing circuit 35 reaches a preset one, the control CPU 22 determines that the driven member 5 has moved to a desired position, and outputs a driving stop command to the signal generation circuit 25. The signal generation circuit 25 stops outputting the driving alternating signal. Vibrations of the ultrasonic vibrator 4 gradually converge and stop.

A driving method specific to the ultrasonic motor according to the first embodiment will be described in detail. Five driving methods <Driving Method 1> to <Driving Method 5> will be exemplified as typical examples of the driving method. In each example of the driving method, the ultrasonic motor is driven by switching two, first and second driving phase differences.

Note that the control CPU 22 performs the driving phase difference switching processing by reading out various parameters regarding switching of the driving phase difference which are set in the parameter table 24, as described above. Examples of these parameters are a parameter indicating the "duration of driving", those indicating the "maximum and minimum values of the duration of driving", those indicating the "increment and decrement of the duration of driving", and those indicating the "maximum and minimum values of the increment/decrement of the duration of driving".

FIGS. 8 to 12 are charts showing driving concepts in <Driving Method 1> to <Driving Method 5>, respectively.

<Driving Method 1>

In driving method 1, the ultrasonic motor is driven by alternately switching between the first and second driving phase differences. The duration of driving based on the first driving phase difference is kept increased by a predetermined width every time the driving phase difference is switched.

Figure 8:
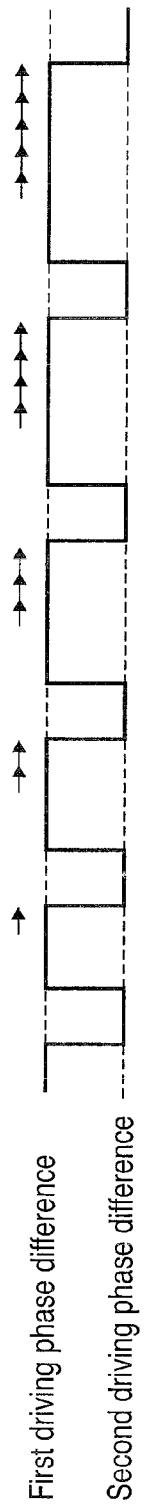
FIG. 8 is a chart showing a driving concept of <Driving Method 1>.

That is, in driving method 1, as shown in FIG. 8, the ultrasonic motor is driven by switching between the first and second driving phase differences. The duration of driving based on the first driving phase difference is kept increased by a predetermined width every time the driving phase difference is switched.

<<Modification>>

Although not shown, the duration of driving may be decreased (as long as it does not reach 0), instead of increasing the duration of driving.

According to driving method 1, the periodicity of switching of the driving phase difference is completely lost. However, the driving speed simply increases/decreases. For this reason, driving method 1 is not suited to continuous burst driving. However, driving method 1 is very effective for single burst driving, and driving of burst-outputting a predetermined number of pulses and then stopping the output.

<Driving Method 2>

In driving method 2, the ultrasonic motor is driven by alternately switching between the first and second driving phase differences. Maximum and minimum values are set for the duration of driving based on the first driving phase difference. The duration of driving is increased/decreased by a predetermined width every time the driving phase difference is switched. When the duration of driving reaches the maximum or minimum value, the increase/decrease is switched, and the duration of driving is decreased/increased by a predetermined width.

Figure 9:
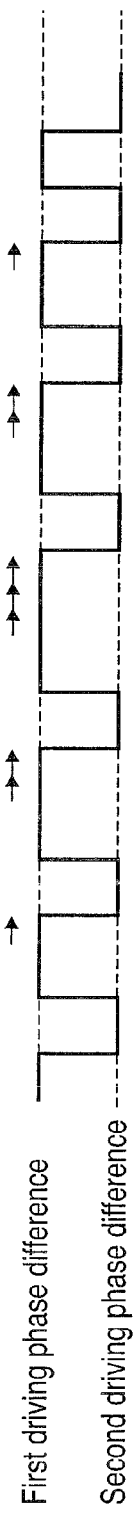
FIG. 9 is a chart showing a driving concept of <Driving Method 2>.

That is, in driving method 2, as shown in FIG. 9, the ultrasonic motor is driven by switching between the first and second driving phase differences. The duration of driving based on the first driving phase difference is kept increased by a predetermined width. When the duration of driving reaches a preset maximum value, the duration of driving is kept decreased by a predetermined width from the next switching of the driving phase difference.

Although not shown, the duration of driving based on the first driving phase difference is kept decreased by a predetermined width every time the driving phase difference is switched. When the duration of driving reaches a preset minimum value, the duration of driving is kept increased by a predetermined width from the next switching of the driving phase difference.

According to driving method 2, the periodicity of switching of the driving phase difference is greatly impaired. In other words, the frequency of the switching cycle of the driving phase difference becomes low (cycle becomes long). Thus, driving method 2 is very effective for both single burst driving and continuous burst driving. It is more effective to set a modulated frequency outside the audible range.

<Driving Method 3>

In driving method 3, the ultrasonic motor is driven by alternately switching between the first and second driving phase differences. The duration of driving based on the first driving phase difference is kept increased every time the driving phase difference is switched. The increment itself is kept increased every time the driving phase difference is switched.

Figure 10:
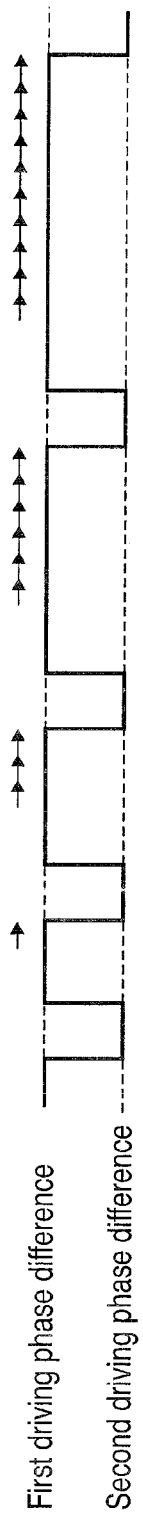
FIG. 10 is a chart showing a driving concept of <Driving Method 3>.

That is, in driving method 3, as shown in FIG. 10, the ultrasonic motor is driven by alternately switching between the first and second driving phase differences. At this time, the duration of driving based on the first driving phase difference is increased every time the driving phase difference is switched. The increment itself is kept increased by a predetermined width.

In other words, driving method 3 complies with <Driving Method 1> except that the increment of the duration of driving based on the first driving phase difference is kept increased by a predetermined width every time the driving phase difference is switched.

<<Modification>>

When the ultrasonic motor is driven by not increasing but decreasing the duration of driving, like <<Modification>> of <Driving Method 1>, it suffices to increase the decrement of the duration of driving by a predetermined width every time the driving phase difference is switched as long as the duration of driving and its decrement do not reach 0.

According to driving method 3, the periodicity of switching of the driving phase difference is completely lost. However, the driving speed simply increases/decreases. Hence, driving method 3 is not suited to continuous driving. However, driving method 3 is very effective for single burst driving, i.e., driving of burst-outputting a predetermined number of pulses and then stopping the output.

<Driving Method 4>

In driving method 4, the ultrasonic motor is driven by alternately switching between the first and second driving phase differences. The duration of driving based on the first driving phase difference is kept increased every time the driving phase difference is switched. The increment itself is increased/decreased within the range of a preset maximum value to minimum one every time the driving phase difference is switched.

Figure 11:
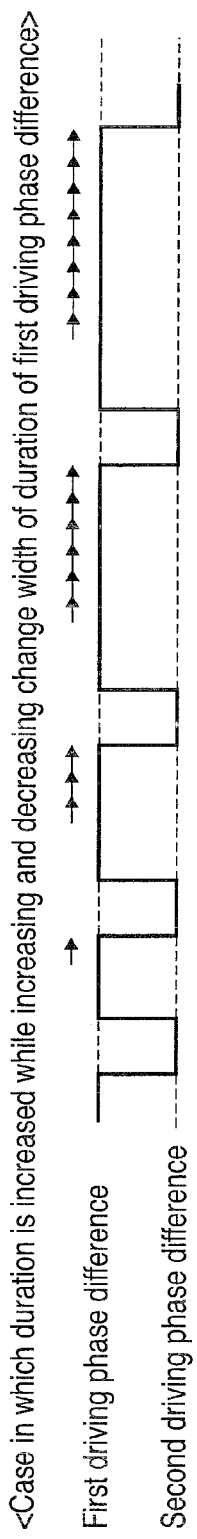
FIG. 11 is a chart showing a driving concept of <Driving Method 4>.

That is, as shown in FIG. 11, the increment is kept increased until it reaches the maximum value.

After the increment reaches the maximum value, it is decreased. After the increment reaches the minimum value, it is kept increased again. While the increment itself is increased/decreased in the same way within the range of a preset maximum value to minimum one, the duration of driving based on the first driving phase difference is increased.

According to driving method 4, the periodicity of switching of the driving phase difference is completely lost. However, the driving speed simply increases/decreases. For this reason, driving method 4 is not suitable for continuous burst driving. However, driving method 4 is very effective for single burst driving, and driving of burst-outputting a predetermined number of pulses and then stopping the output.

<Driving Method 5>

In driving method 5, the ultrasonic motor is driven by alternately switching between the first and second driving phase differences. The duration of driving based on the first driving phase difference is changed, and the change width is also changed.

Figure 12:
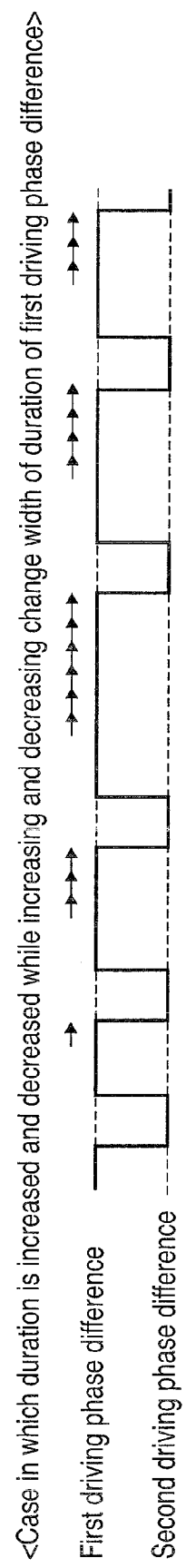
FIG. 12 is a chart showing a driving concept of <Driving Method 5>.

That is, in driving method 5, as shown in FIG. 12, maximum and minimum values are set for each of the increment and decrement of the duration of driving based on the first driving phase difference. When the increment or decrement reaches the maximum or minimum value, the decrease/increase is switched. In other words, the duration of driving based on the first driving phase difference is changed while switching the increment/decrement within the range of a minimum value to maximum one.

According to driving method 5, the periodicity of switching of the driving phase difference is greatly impaired. In other words, the frequency of the switching cycle of the driving phase difference becomes low (cycle becomes long). Driving method 5 is effective for both single burst driving and continuous burst driving. It is more effective to set a modulated frequency outside the audible range.

Note that the above-mentioned "parameters regarding switching of the driving phase difference" are stored in, for example, the parameter table 24. Examples of the "parameters regarding switching of the driving phase difference" are a parameter indicating the duration of driving based on the first driving phase difference, those indicating the maximum and minimum values of the first driving phase difference, those indicating the increment and decrement of the duration of driving based on the first driving phase difference, and those indicating the maximum and minimum values of the increment and decrement of the duration of driving based on the first driving phase difference.

As described above, the first embodiment can provide an ultrasonic motor which reduces generation of abnormal noise upon driving.

More specifically, the ultrasonic motor according to the first embodiment can greatly reduce generation of abnormal noise upon stable driving at low speed.

Second Embodiment

An ultrasonic motor according to the second embodiment of the present invention will be described. Only a difference of the second embodiment from the first embodiment will be explained to avoid a repetitive description of the ultrasonic motor according to the first embodiment.

In the ultrasonic motor according to the second embodiment, the driving method specific to the ultrasonic motor according to [First Embodiment] is applied to wear powder removal driving (operation in the cleaning mode).

After a description of the background and conventional technique of the cleaning mode, the operation of the ultrasonic motor in the cleaning mode according to the second embodiment will be explained.

As described above, in the ultrasonic motor, alternating signals are applied to an ultrasonic vibrator 4 having driving members 10 in contact with a driven member 5, generating elliptic vibrations at the positions of the driving members 10. The driving members 10 and driven member 5 come into contact with each other under pressure, relatively driving the driven member 5 frictionally by the elliptic vibrations.

When the ultrasonic motor is driven for a long time, the driving members 10 are worn upon sliding on the driven member 5, and wear powder generated by the wear is fixed to the surface of the driven member 5 that is a frictional surface. Needless to say, the fixation of the wear powder adversely affects the driving state.

Under the circumstances, it has conventionally been proposed to separately arrange a wear powder removal member and shave wear powder by the member, in order to remove wear powder. However, in this method, the separately arranged additional member increases the device size.

In contrast, the ultrasonic motor according to the second embodiment can remove wear powder without increasing the device size. More specifically, the ultrasonic motor according to the second embodiment takes the following methods:

<<Method 1>> A range exceeding a normal driving range (wear powder deposition region) where wear powder may be fixed is defined as a driving range. The ultrasonic motor is reciprocally driven by a plurality of number of times.

<<Method 2>> The driving phase difference during reciprocal driving is changed to easily remove fixed wear powder. More specifically, the ultrasonic motor is driven by alternately switching between the first driving phase difference (e.g., 90°) for obtaining a desired speed, and the second driving phase difference (e.g., 180°) for making the speed of flexural vibrations among vibrations generated in the ultrasonic vibrator 4 be higher than that obtained using the first driving phase difference.

Note that the cleaning effect can be obtained to a certain degree by executing only driving described in <<Method 1>> using only the first driving phase difference for obtaining a desired speed. However, when driving described in <<Method 2>> is done at the same time, a vibration state in which the flexural vibration component becomes large can be attained upon driving using the second driving phase difference. The driving members 10 beat the surface of the driven member 5 at an acute angle, effectively peeling off fixed wear powder.

In the ultrasonic motor according to the second embodiment, the driving method specific to the ultrasonic motor according to [First Embodiment] is applied to the driving phase difference switching operation described in <<Method 2>>.

Figure 13:
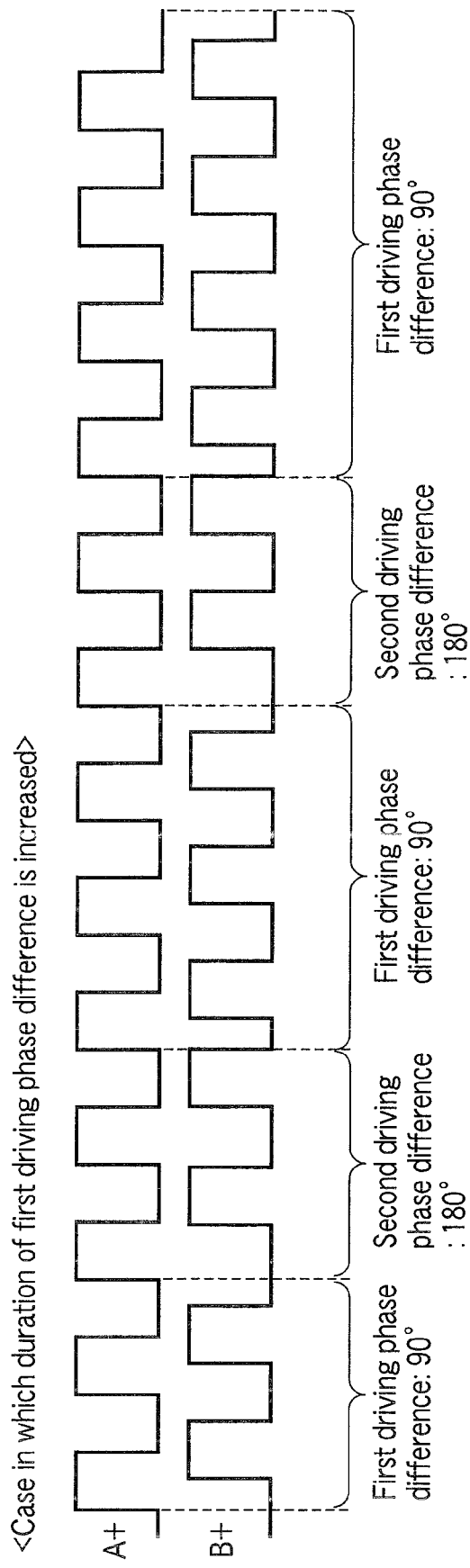
FIG. 13 is a chart showing a driving concept in the cleaning mode of an ultrasonic motor according to the second embodiment.

FIG. 13 is a chart showing a driving concept in the cleaning mode of the ultrasonic motor according to the second embodiment. As shown in FIG. 13, in the cleaning mode, the ultrasonic motor reciprocates in a predetermined driving range by a plurality of number of times by alternately switching between the first and second driving phase differences. Every time the driving phase difference is switched in driving in one direction of reciprocal driving, the duration of driving based on the first driving phase difference is increased.

In the example shown in FIG. 13, <Driving Method 1> of the ultrasonic motor according to [First Embodiment] is applied to an operation in the cleaning mode.

Note that one of <Driving Method 2> to <Driving Method 5> other than <Driving Method 1> is also applicable to an operation in the cleaning mode.

As described above, the second embodiment can provide an ultrasonic motor capable of obtaining the same effects as those of the ultrasonic motor according to the first embodiment even in an operation in the cleaning mode.

More specifically, the ultrasonic motor according to the second embodiment can achieve the following effects:

Since a range exceeding a normal driving range is defined as a driving range, deposited wear powder can be moved to a region where it does not obstruct normal driving.

Wear powder fixed to the driven member 5 can be scraped off much more upon driving based on the second driving phase difference in which the ratio of the flexural vibration component to vibrations generated in the ultrasonic vibrator 4 becomes high.

If the ultrasonic motor is driven using only the second driving phase difference, the driving speed of the ultrasonic motor decreases owing to a high ratio of the flexural vibration component. This is unpreferable in a situation in which the cleaning operation needs to end within a short time. However, the second driving phase difference is appropriately switched to the first one for obtaining a desired speed. Fixed wear powder can be effectively peeled off while maintaining the driving speed of the ultrasonic motor.

Generation of abnormal noise can be greatly reduced by applying the driving method specific to the ultrasonic motor according to [First Embodiment] to switching between the first and second driving phase differences.

An operation in the cleaning mode can keep the surface of the driven member 5 clean, enabling long-time driving and long service life of the ultrasonic motor. More specifically, the following results were obtained. A cleaning operation was done by reciprocally driving the ultrasonic motor by alternately switching the driving phase difference between 90° and 180°. Compared to a cleaning operation of reciprocally driving the ultrasonic motor using a driving phase difference of 90°, the total driving count until the motor stopped increased by 1.5 to 2.0 times in a long-time driving test.

Still another driving phase difference may be set between the first and second driving phase differences to drive the ultrasonic motor by switching between these driving phase differences.

The present invention has been described based on the first and second embodiments. However, the present invention is not limited to the above-described embodiments, and can be variously modified and applied without departing from the scope of the invention.

The above-described embodiments include inventions on various stages, and various inventions can be extracted by an appropriate combination of building components disclosed. For example, even if several building components are omitted from all those described in the embodiments, an arrangement from which the building components are omitted can also be extracted as an invention as long as the problems described in Description of the Related Art can be solved and effects described in BRIEF SUMMARY OF THE INVENTION can be obtained.

In the above example, the duration of driving using driving signals having the first driving phase difference is changed. Instead, the duration of driving using driving signals having the second driving phase difference may be changed. Also, both the duration of driving using driving signals having the first driving phase difference and that of driving using driving signals having the second driving phase difference may be changed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ultrasonic motor in which driving signals of two phases are applied to a vibrator having a driving member in contact with a driven member to simultaneously generate a longitudinal vibration and a flexural vibration, thereby generating an elliptic vibration in the vibrator, and the driving member frictionally drives the driven member upon obtaining a driving force from the elliptic vibration, the motor comprising a driving phase difference switching unit which switches a driving phase difference serving as a phase difference between the driving signals of the two phases, and changes a switching cycle of the driving phase difference, wherein the driving phase difference switching unit switches between a first driving phase difference for obtaining a desired driving speed, and a second driving phase difference for generating a speed of a flexural vibration higher than a speed of a flexural vibration upon driving using the driving signals of the two phases corresponding to the first driving phase difference, the motor further comprises:

a storage unit which stores a plurality of driving phase differences set in advance, and in which the driving phase difference switching unit switches between at least two driving phase differences among the plurality of driving phase differences, wherein the driving phase difference switching unit switches the driving phase difference in a cleaning mode in which the ultrasonic motor is reciprocally driven in a predetermined driving range by a plurality of number of times, and the ultrasonic motor includes a driving range enlarging unit which enlarges the driving range in driving in the cleaning mode.

2. The motor according to claim 1, wherein the driving phase difference switching unit performs switching based on duration of driving using the driving phase difference.

3. The motor according to claim 2, wherein the driving phase difference switching unit increases or decreases the duration of driving every time the driving phase difference is switched.

4. The motor according to claim 3, wherein
a maximum value and a minimum value are set for the duration of driving, and
the driving phase difference switching unit increases or decreases the duration of driving within a range of the maximum value to the minimum value every time the driving phase difference is switched.

5. The motor according to claim 1, wherein the driving phase difference switching unit performs switching based on a change width of duration of driving using the driving phase difference.

6. The motor according to claim 5, wherein the change width of the duration of driving is constant.

7. The motor according to claim 5, wherein the driving phase difference switching unit increases or decreases the change width every time the driving phase difference is switched.

8. The motor according to claim 7, wherein
a maximum value and a minimum value are set for the change width, and
the driving phase difference switching unit increases or decreases the change width within a range of the maximum value to the minimum value every time the driving phase difference is switched.

9. An ultrasonic motor in which driving signals of two phases are applied to a vibrator having a driving member in contact with a driven member to simultaneously generate a longitudinal vibration and a flexural vibration, thereby generating an elliptic vibration in the vibrator, and the driving member frictionally drives the driven member upon obtaining a driving force from the elliptic vibration, the motor comprising a driving phase difference switching unit which switches a driving phase difference serving as a phase difference between the driving signals of the two phases, and changes a switching cycle of the driving phase difference, wherein the driving phase difference switching unit switches between a first driving phase difference for obtaining a desired driving speed, and a second driving phase difference for generating a speed of a flexural vibration higher than a speed of a flexural vibration upon driving using the driving signals of the two phases corresponding to the first driving phase difference, the motor further comprises a storage unit which stores a plurality of driving phase differences set in advance, and in which the driving phase difference switching unit switches between at least two driving phase differences among the plurality of driving phase differences, wherein the driving phase difference switching unit performs switching based on duration of driving using the driving phase difference, wherein the driving phase difference switching unit increases or decreases the duration of driving every time the driving phase difference is switched, and wherein a maximum value and a minimum value are set for the duration of driving, and the driving phase difference switching unit increases or decreases the duration of driving within a range of the maximum value to the minimum value every time the driving phase difference is switched.

10. An ultrasonic motor in which driving signals of two phases are applied to a vibrator having a driving member in contact with a driven member to simultaneously generate a longitudinal vibration and a flexural vibration, thereby generating an elliptic vibration in the vibrator, and the driving member frictionally drives the driven member upon obtaining a driving force from the elliptic vibration, the motor comprising a driving phase difference switching unit which switches a driving phase difference serving as a phase difference between the driving signals of the two phases, and changes a switching cycle of the driving phase difference, wherein the driving phase difference switching unit switches between a first driving phase difference for obtaining a desired driving speed, and a second driving phase difference for generating a speed of a flexural vibration higher than a speed of a flexural vibration upon driving using the driving signals of the two phases corresponding to the first driving phase difference, the motor further comprises a storage unit which stores a plurality of driving phase differences set in advance, and in which the driving phase difference switching unit switches between at least two driving phase differences among the plurality of driving phase differences, wherein the driving phase difference switching unit performs switching based on a change width of duration of driving using the driving phase difference, wherein the change width of the duration of driving is constant.

11. An ultrasonic motor in which driving signals of two phases are applied to a vibrator having a driving member in contact with a driven member to simultaneously generate a longitudinal vibration and a flexural vibration, thereby generating an elliptic vibration in the vibrator, and the driving member frictionally drives the driven member upon obtaining a driving force from the elliptic vibration, the motor comprising a driving phase difference switching unit which switches a driving phase difference serving as a phase difference between the driving signals of the two phases, and changes a switching cycle of the driving phase difference, wherein the driving phase difference switching unit switches between a first driving phase difference for obtaining a desired driving speed, and a second driving phase difference for generating a speed of a flexural vibration higher than a speed of a flexural vibration upon driving using the driving signals of the two phases corresponding to the first driving phase difference, the motor further comprises a storage unit which stores a plurality of driving phase differences set in advance, and in which the driving phase difference switching unit switches between at least two driving phase differences among the plurality of driving phase differences, wherein the driving phase difference switching unit performs switching based on a change width of duration of driving using the driving phase difference, wherein the driving phase difference switching unit increases or decreases the change width every time the driving phase difference is switched.

12. The motor according to claim 11, wherein a maximum value and a minimum value are set for the change width, and the driving phase difference switching unit increases or decreases the change width within a range of the maximum value to the minimum value every time the driving phase difference is switched.

* * * * *